United States Patent
Larson

(10) Patent No.: US 7,244,003 B2
(45) Date of Patent: Jul. 17, 2007

(54) VEHICLE ONBOARD BRAKE PAD/LINING WEAR ESTIMATORS WITH TEMPERATURE ESTIMATIONS

(75) Inventor: Gerald L. Larson, Fort Wayne, IN (US)

(73) Assignee: International Truck Intellectual Property Company, LLC, Warrenville, IL (US)

(*) Notice: Subject to any disclaimer, the term of this patent is extended or adjusted under 35 U.S.C. 154(b) by 113 days.

(21) Appl. No.: 11/016,976

(22) Filed: Dec. 20, 2004

(65) Prior Publication Data

US 2006/0131950 A1    Jun. 22, 2006

(51) Int. Cl.
F16F 66/02    (2006.01)

(52) U.S. Cl. .................... 303/191; 188/1.11 L

(58) Field of Classification Search ............. 303/191; 188/1.11 R
See application file for complete search history.

(56) References Cited

U.S. PATENT DOCUMENTS

| | | | |
|---|---|---|---|
| 3,670,300 A | 6/1972 | Depenheuer | |
| 3,675,197 A | 7/1972 | Bennett et al. | |
| 3,713,091 A | 1/1973 | Kobayashi et al. | |
| 4,020,454 A | 4/1977 | Maloee | |
| 4,037,689 A | 7/1977 | Maehara | |
| 4,290,514 A | 9/1981 | McConnell et al. | |
| 4,374,375 A | 2/1983 | Allori et al. | |
| 4,440,279 A | 4/1984 | Schreiner | |
| 4,583,071 A | 4/1986 | Sebalos et al. | |
| 4,591,213 A * | 5/1986 | Rapoport ............... | 303/191 |
| 4,790,606 A * | 12/1988 | Reinecke ............... | 303/191 |
| 4,855,712 A | 8/1989 | Wiley, Jr. et al. | |
| 4,995,480 A | 2/1991 | Hazelden et al. | |
| 5,087,907 A | 2/1992 | Weiler et al. | |
| 5,131,268 A | 7/1992 | Dillmann | |
| 5,302,940 A | 4/1994 | Chen | |
| 5,339,069 A | 8/1994 | Penner et al. | |
| 5,421,436 A | 6/1995 | Lindner et al. | |
| 5,433,296 A | 7/1995 | Webberley | |
| 5,524,974 A * | 6/1996 | Fischle et al. ........... | 303/191 |
| 5,525,777 A | 6/1996 | Kukuljan | |
| 5,596,513 A | 1/1997 | Schricker | |
| 5,636,026 A | 6/1997 | Mian et al. | |
| 5,637,794 A | 6/1997 | Hanisko | |
| 5,651,431 A | 7/1997 | Kyrtsos | |
| 5,668,529 A | 9/1997 | Kyrtsos | |
| 5,685,619 A | 11/1997 | Brown | |
| 5,731,975 A * | 3/1998 | Nakashima ............... | 701/83 |
| 5,752,586 A | 5/1998 | Evans | |
| 5,848,673 A | 12/1998 | Strauss et al. | |
| 5,909,171 A | 6/1999 | Kyrtsos | |

(Continued)

Primary Examiner—Robert A. Siconolfi
(74) Attorney, Agent, or Firm—Jeffrey P. Calfa; Gerald W. Askew; Susan L. Lukasik

(57) ABSTRACT

The brake lining and wear estimation system operates using extant vehicle sensors such as those used to implement height and stability control systems or anti-lock brake systems. This minimizes, or eliminates, the need to modify the brake units themselves. Compressed air systems used on heavy duty vehicles to support the operation of various systems, including air brakes, provide pressure monitoring features in various pneumatic circuits, which can be monitored to estimate brake lining application pressure or vehicle loading. Vehicle speed and brake actuation periods are derived from other commonly employed sensors. Data collected from the sensors is supplied to a central, programmable computer over a data bus to generate the heat and wear estimates.

4 Claims, 7 Drawing Sheets

U.S. PATENT DOCUMENTS

| | | |
|---|---|---|
| 5,922,971 A | 7/1999 | Schmitt et al. |
| 5,939,978 A | 8/1999 | Kyrtsos |
| 5,992,579 A | 11/1999 | Kyrtsos |
| 5,999,093 A | 12/1999 | Hanisko |
| 6,119,059 A | 9/2000 | Tai et al. |
| 6,124,788 A | 9/2000 | Hanisko |
| 6,129,183 A | 10/2000 | Ward |
| 6,158,822 A | 12/2000 | Shirai et al. |
| 6,188,948 B1 | 2/2001 | Shivler, Jr. |
| 6,203,123 B1 * | 3/2001 | Oyama ................... 303/191 |
| 6,215,394 B1 | 4/2001 | Sellin |
| 6,250,429 B1 | 6/2001 | Kramer |
| 6,250,430 B1 | 6/2001 | Kyrtsos |
| 6,257,374 B1 | 7/2001 | Strzelczyk et al. |
| 6,260,665 B1 | 7/2001 | Kramer et al. |
| 6,302,241 B1 | 10/2001 | Gronowicz et al. |
| 6,396,395 B1 | 5/2002 | Zielinski et al. |
| 6,450,587 B1 | 9/2002 | MacGregor et al. |
| 6,456,922 B1 * | 9/2002 | Gamberg ................... 701/71 |
| 6,612,736 B2 * | 9/2003 | Lee et al. ................. 374/153 |
| 2004/0212251 A1 * | 10/2004 | Kinder et al. ............. 303/191 |

* cited by examiner

VEHICLE ONBOARD BRAKE PAD/LINING WEAR ESTIMATORS WITH TEMPERATURE ESTIMATIONS

BACKGROUND OF THE INVENTION

1. Technical Field

The invention relates to a system for brake lining wear and temperature estimation and more particularly to such a system implemented using extant sensing elements of an air brake system, of an air suspension system, or both.

2. Description of the Problem

Effective brakes are essential to safe motor vehicle operation. Primary brake systems dissipate vehicle kinetic energy through brake friction linings/pads as heat. These brake pads have a relatively short life and require regular replacement. Heavy vehicles have historically exhibited problems with brake overheating and fade, especially when the vehicles are descending along long grades. Overheating reduces stopping ability and accelerates brake pad wear.

Inspection of the brake system has traditionally involved disassembly of the wheel mechanism and visual examination of the pads. It has long been recognized that it would be desirable to incorporate some kind of sensor into the brake pads that monitor wear of the pads without the need to disassemble the brake system. Were the same sensor used to monitor brake temperature the addition to vehicle complexity would be minimized.

Various brake lining wear detection systems and brake temperature measurement systems are known in the art. Indirect wear or temperature estimation systems which minimize, or avoid alteration of the brake system are less usual. In principal, brake wear has been related to three variables in brake operation: (1) the pressure at which the brakes are actuated; (2) the length of time that the brakes are actuated; and (3) the rotational speed of the brake disc or drum relative to the wearable friction elements. These factors were applied in a system for determining lining condition as described in German Laid Open Application DE 34 07 716 A1 to Maurer, et al. The apparatus described by Maurer, et al. provides a pressure sensor and a timer disposed in operational cooperation with at least one of the brake lining installations for a vehicle. The rotational velocity of the disc (or brake drum) is provided by a velocity sensor. Beginning with a new installation of brake linings the signals generated by the various sensors are supplied to a plotting device which in turn generated a wear index (tracking an internal model) for display to the vehicle operator. Estimation of the brake lining wear was indirect, but the system still relied on additional sensors placed in close proximity to the brake lining.

In European Patent Application 0 594 113, temperature calculation was made fully indirect. The signal generated by a pressure sensor such as might be placed on a brake control valve was used as an indicator of brake pressure. This signal and a speedometer signal were used as inputs to an incremental brake temperature calculation algorithm as long as the signal of the pressure sensor was high. Brake temperature was incrementally decremented when the pressure sensor signal indicated that the brake was off. The algorithm operated cyclically.

SUMMARY OF THE INVENTION

According to the invention there is provided a motor vehicle brake lining temperature and wear estimation system. The brake lining and wear estimation system operates using extant vehicle sensors such as those used to implement height and stability control systems or anti-lock brake systems, minimizing, or eliminating, the need to modify the brake units themselves. Compressed air systems used on heavy duty vehicles to support the operation of various systems, including air brakes, and provide pressure monitoring features in various pneumatic circuits, which can be monitored to estimate brake lining application pressure. Wheel speed, which in turn can be equated to brake rotor speed, is used to determine the area of the rotor swept by the brake lining. Duration of application of the brakes is supplied by the duration of anti-lock brake system actuation signals. All of this data is supplied over a vehicle integrated data bus, preferably a bus conforming to the SAE J1939 standard, to a programmable body computer which operates on the data to produce instantaneous estimates of brake lining wear and brake lining temperature. Similarly, a height controller using air springs can monitor pressure in the air springs to determine vehicle axle loading. Axle loading can be used in combination with wheel or vehicle speed sensing to determine changes in kinetic energy of the vehicle. Further correlated to brake actuation signals, the portion of the kinetic energy dissipated through the brakes can be estimated to generate estimates of wear and temperature for the brake linings.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 6 is a perspective view of a drum brake such as the present invention might be used to estimate the condition of.

DETAILED DESCRIPTION OF THE INVENTION

Figure 1:
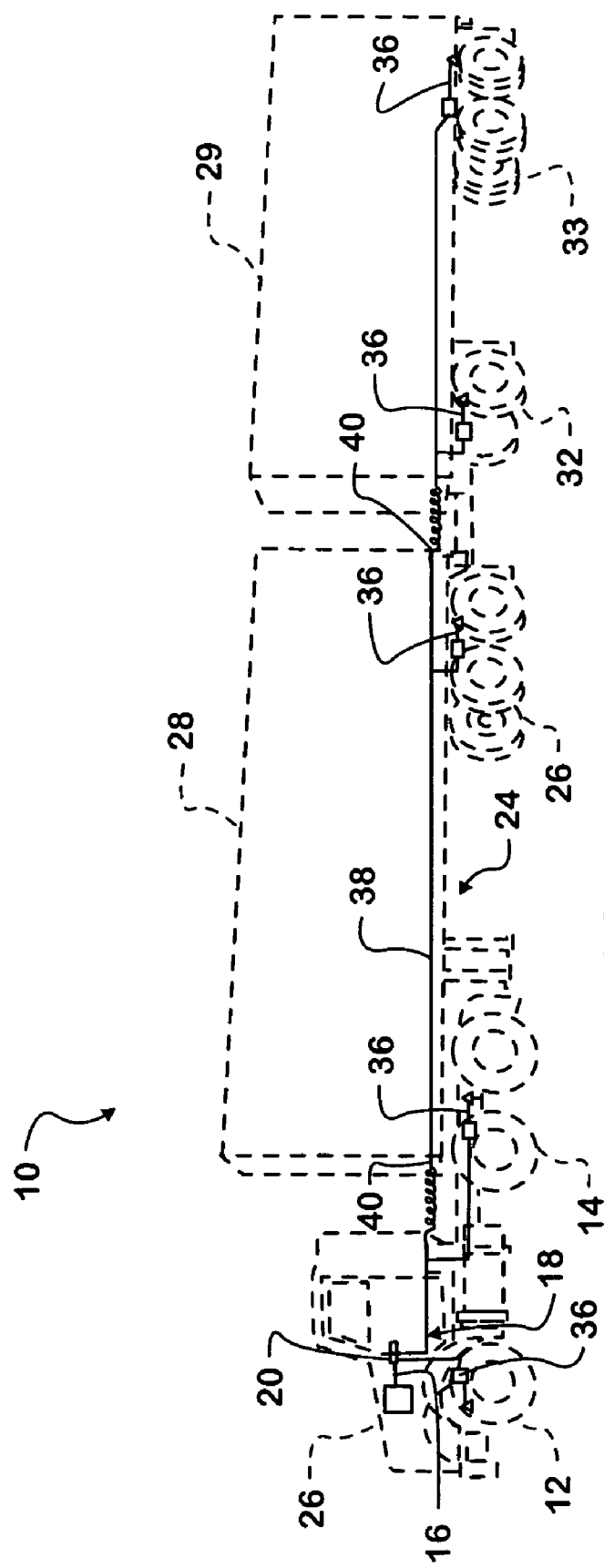
FIG. 1 depicts a tandem trailer/tractor combination such as might provide an environment for the vehicle.

The present invention is equally applicable to either drum brakes or disc brakes, although it is expected to find applicability primarily with drum brakes used in air brake systems on heavy duty trucks. The present invention is also applicable to pneumatically and hydraulically actuated brakes, although it is described with reference to a preferred pneumatic system. Referring now in particular to FIG. 1, a tandem trailer/tractor combination 10 equipped with air brake system 24 is illustrated as a possible environment of application for a preferred embodiment of the present invention. Tandem trailer/tractor combination 10 includes a tractor 26 and two trailers, 28 and 29, respectively. Tractor 26 and trailers 28,29 are supported on wheels 12,14, 26, 32 and 33, the rotation of which may be slowed or stopped using air pressure actuated brakes 36. Air brake system 24 may be considered as including an air pressurization and storage subsystem including a compressor 16, storage tanks 18 and air lines 20, 40 and 38. The details of air brake system 24 are otherwise conventional.

Figure 2:
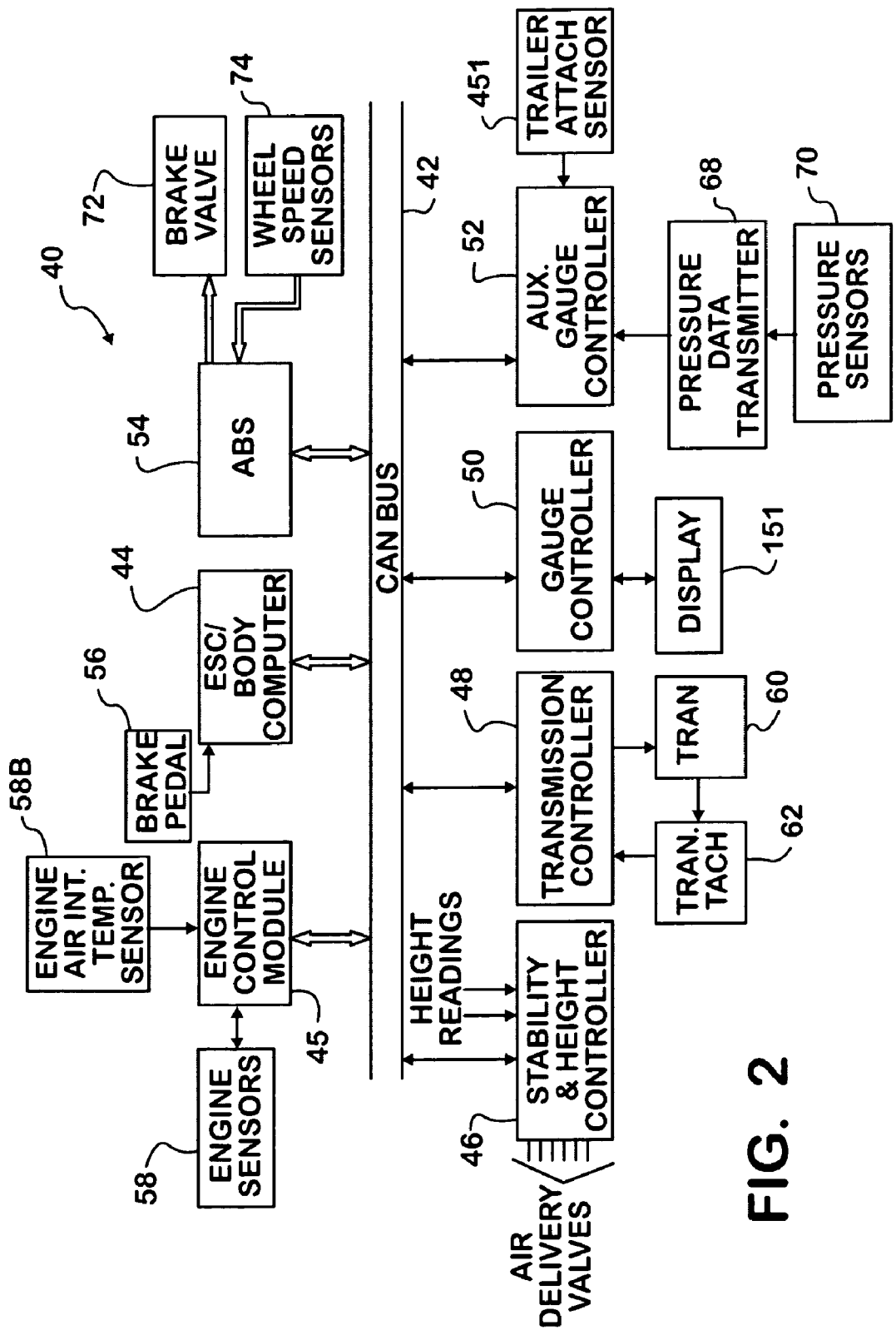
FIG. 2 is a block diagram of a vehicle electronic control system.

FIG. 2 illustrates a vehicle electrical control system 40 having a controller area network (CAN) bus 42 as its backbone. CAN bus 42 conforms to the SAE J1939 protocol and provides for data transmission between a plurality of controllers connected to the bus including, an electrical system controller (ESC)/body computer 44, an engine control module 45, a stability and height controller 46, a transmission controller 48, a gauge controller 50, an auxiliary gauge controller 52 and an anti-lock brake system (ABS) controller 54. These controllers are generally attached to one or more devices the status of which may be transmitted over CAN bus 42 by its associated controller for the use of other controllers. For example, engine controller 45 is generally connected to a plurality of engine sensors 58 including, among other sensors, an engine air intake temperature sensor. The value generated by engine air intake temperature sensor 58B may be used as a proxy value for ambient air temperature. The signal is exogenetic to the brake units. Transmission controller 48 controls a transmission 60 the output of which is measured by a drive shaft tachometer 62. This signal may be used to generate a measurement of vehicle speed. A stability and height controller 46 controls the inflation of a plurality of air springs forming part of the vehicle suspension and represents an exogenous user of compressed air and which may be utilized to determine axle loading. Gauge controller 50 and auxiliary gauge controllers 52 are often used to collect and format telemetry from vehicle sensors. Here various pressure sensors 70, which is described below include a compressed air tank pressure sensor 71 and individual brake line pressure sensors 304, are shown as monitored by pressure data transmitters 68 connected to the auxiliary gauge controller 52. Under some circumstances air pressure may be reported directly to the engine control module 45 or to body computer 44. Auxiliary gauge controller 52 also provides an intermediary connector for a trailer attachment sensor 451. ABS controller 54 provides control over brake valves 72 responsive to signals received from body computer 44 and a plurality of wheel speed sensors 74 directly connected to the ABS controller. Body computer 44, which operates as a coordinator between other controllers and is programmable, is typically connected to a brake pedal switch 56 and accordingly determines the brake pedal's position. The various connections between sensors and controllers is somewhat flexible. For example, drive shaft tachometer 62 may be connected to report its output directly to engine control module 45 instead of to transmission controller 48.

Figure 3:
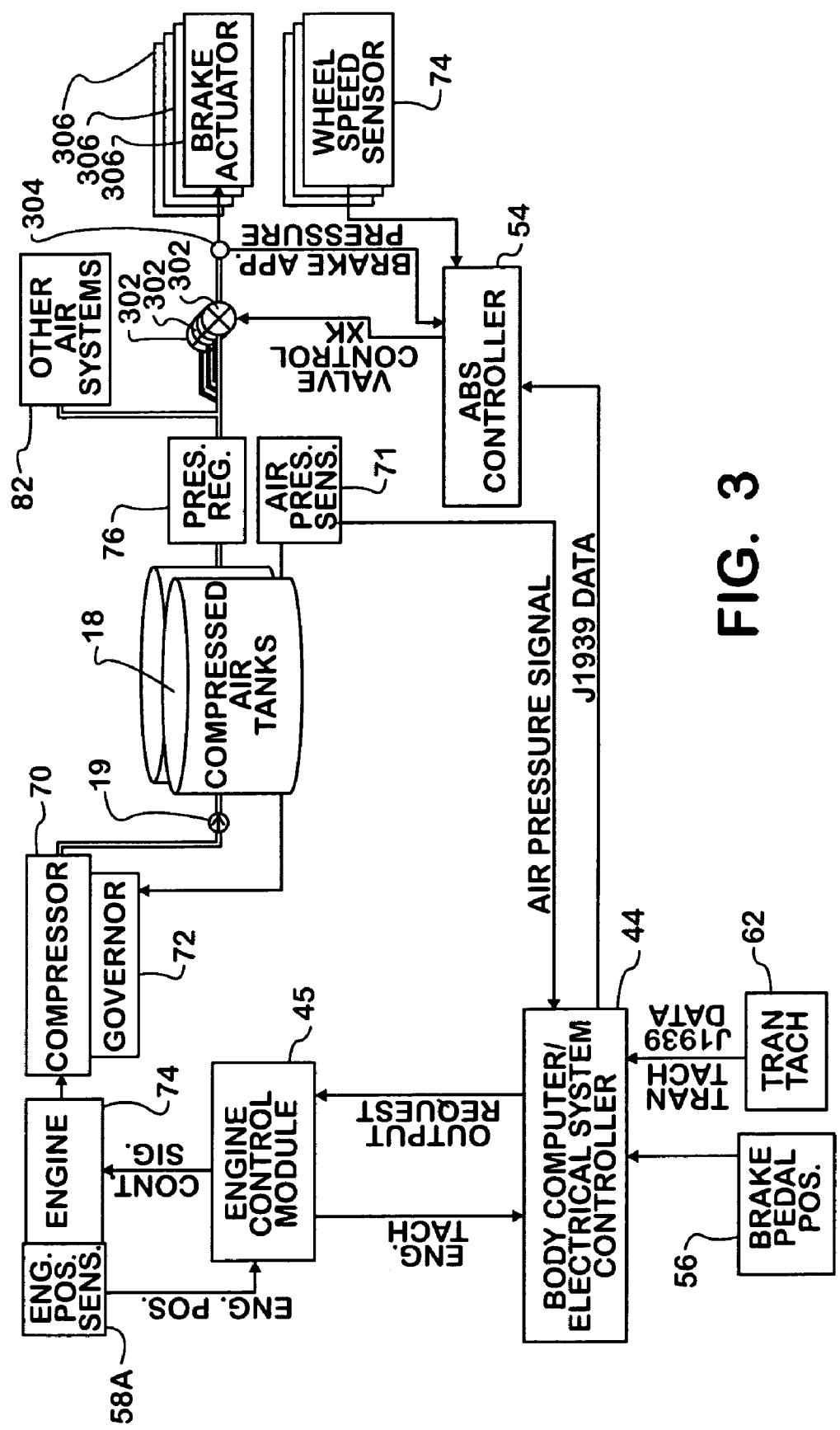
FIG. 3 is a block diagram illustration of an air brake control system.

FIG. 3 is a schematic illustration of a set of controllers for an air brake system 80 involved in implementing a preferred embodiment of the invention. A vehicle engine 74 is mechanically linked to drive a compressor 70 which supplies air by a check valve 19 to compressed air storage tanks 18. The representation of the air tanks 18 is simplified by not showing such components of a conventional air system such as an air dryer, and not distinguishing between dry tanks and wet tanks. As is conventional, the system is designed to maintain air pressure in a range of 100 to 125 psi. Air pressure is maintained by using a compressor 70 under the control of a governor 72, which is responsive to air pressure communicated on a line to one of compressed air tanks 18, usually a wet tank. Air pressure signals developed by air pressure sensor 71 are passed to body computer 44, typically over CAN bus 42. Air pressure sensor 71 is typically in communication with one of the dry tanks. Where two dry tanks are used either tank may be selected. Body computer 44 receives an engine tachometer signal from engine control module 45, which is derived from an engine crankshaft position sensor 58A. Brake pedal position sensor 56 functions as described above. Vehicle speed 84 may be supplied from a transmission controller (not shown) or the engine control module 45, which generate the signal from the drive shaft tachometer. Preferably, individual wheel speed signals generated by a plurality of wheel speed sensors 74 associated with the ABS controller 54 provide accurate wheel speeds for each wheel. ABS controller 54 and body computer 44 may exchange data relating to air brake system operation 80.

Upon generation of a braking demand signal with displacement of the brake pedal as detected by brake pedal position sensor 56 a braking demand signal is supplied from body computer 44 to ABS controller 54, which meters the application of air pressure to each of a plurality of actuators 306 by the control of a plurality of valves 302. One each of valves 302 is associated with a particular brake assembly 410, such as the brake drum assembly depicted in FIG. 4, and brake actuator 306. The air pressure applied to each brake actuator 306 is measured using an air pressure sensor 304. This air pressure signal is responsive to the brake actuation signals generated by the ABS controller 54. ABS controller 54 reports time duration of the actuation signals for each brake actuator 306, the pressure in the air brake line to each brake actuator from pressure sensors 304, and, if available, the wheel speed signal from wheel speed sensors 74. Illustration of the present invention with an anti-lock brake system does not limit the invention to use with such a system.

Figure 4:
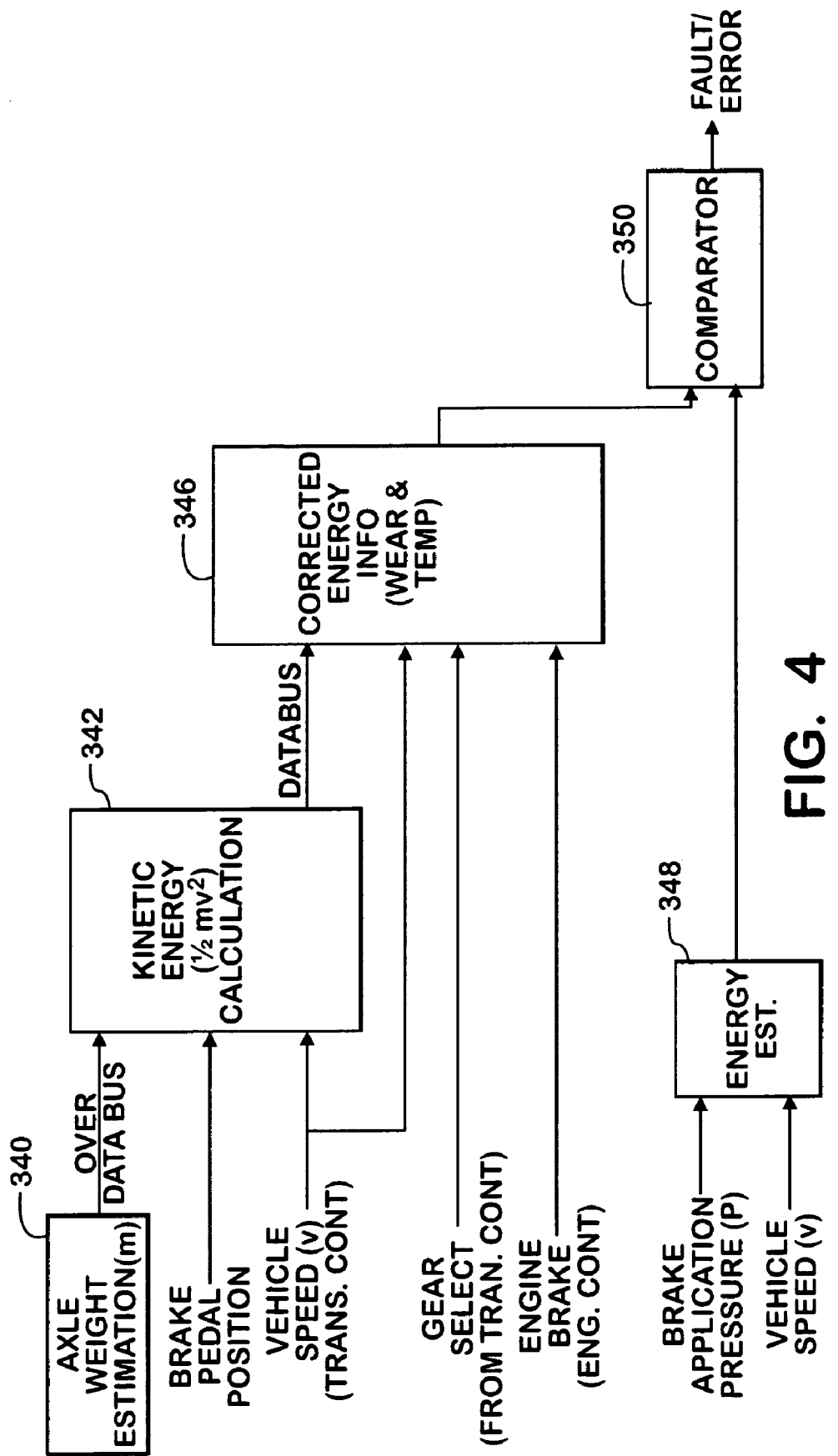
FIG. 4 is a simplified data flow diagram illustrating a portion of the invention.

Referring to FIG. 4, the source and flow of data used to determine kinetic energy dissipated during braking is illustrated. Depending vehicle configuration, one or two methods of determining kinetic energy may be implemented. The stability and height controller 46 generates axle loading estimations 340 which may be summed to find weight or mass. This result is broadcast over the CAN bus 42. Transmission controller 48 (or body computer 44) reads the weight data/mass data and combines it with locally generated vehicle speed (or a proxy therefore) from the transmission tachometer 62 to generate a kinetic energy calculation 342. Where the process is initiated by engagement of the brakes, a change in kinetic energy during the period of brake engagement is readily determined. Brake status is provided by body computer 44.

Heavy duty trucks frequently incorporate engine brakes, the use of which forces correction of the change in kinetic energy calculation. The correction calculation may be carried out by the body computer 44 or the engine control module 45 from the raw kinetic energy calculation 342 and additional data used to determine energy expended by the vehicle's engine operating as a brake. This data includes vehicle speed (V), the current gear selection from the transmission controller 48 and indication of operation of the engine as a brake from the engine control module 45. Combination of these factors allows determination of a corrected energy data 346. This energy calculation figure is available for vehicles equipped with either hydraulic or pneumatic brake actuation systems.

Where pneumatic brakes are used, a second, preferred method of determination of the dissipation of energy through the friction brakes is readily available. Brake application pressure, derived possibly from the auxiliary gauge controller 52 pressure readings, is combined with changes in vehicle speed (V) measurement to produce energy estimate 348. Where corrected energy data 346 and energy estimate 348 are both available, they may be supplied to a comparator operation 350 executed by the body computer 44 for a fault determination.

Figure 5:
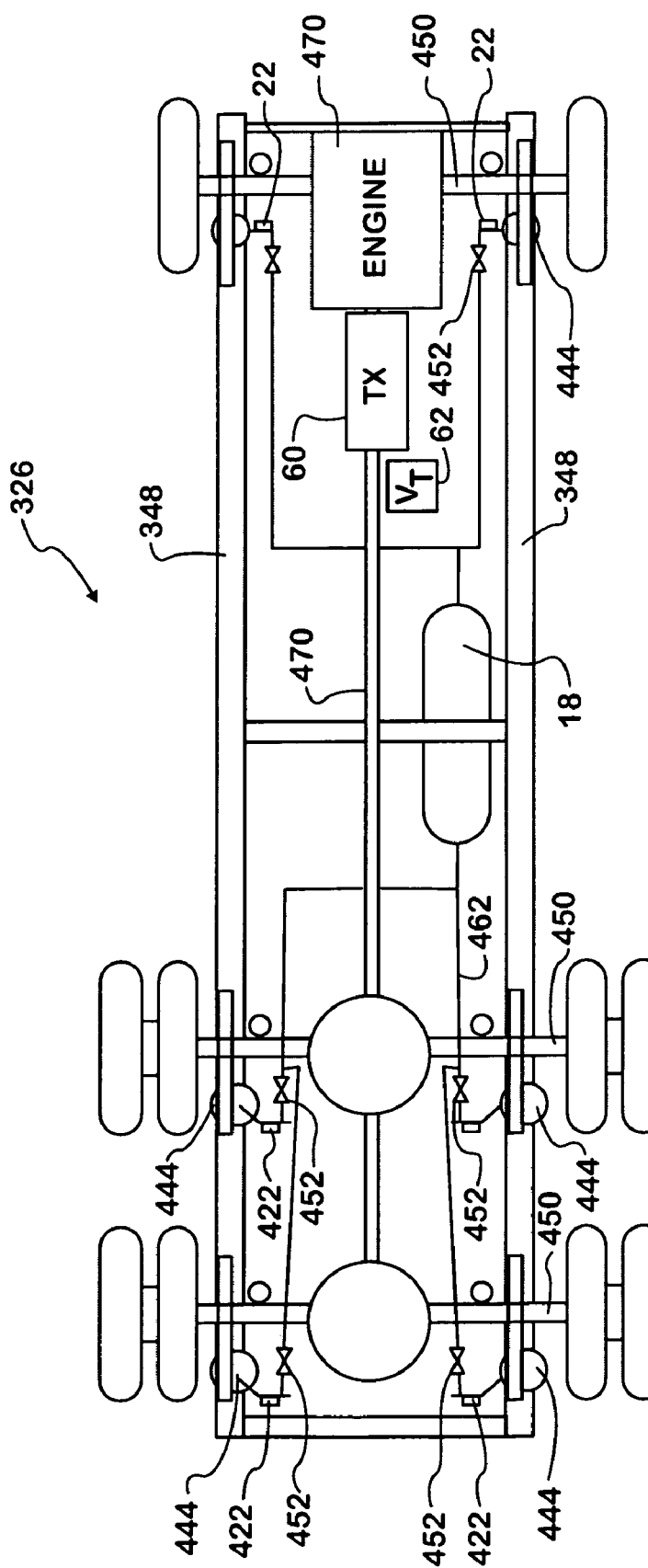
FIG. 5 is a layout for a tractor air suspension system.

Referring to FIG. 5, a tractor 26 illustrates individual height leveling valves 452 which are provided for each air spring 44. Pressure sensors 422 are connected into the pneumatic circuit for each air spring fed by a height leveling valve 452 which allow for axle load determination. Air springs 444 are fitted between frame side rails 48 and axles 450. Air lines 462 connect compressed air tank 18, which is installed on tractor 26 between side frame rails 48, to the valves 452. An engine 470 provides motive power for tractor 26, driving a propeller shaft 476 by a transmission 72. A tachometer 62 may be coupled to propeller shaft 76 to determine the average rotational velocity of the drive wheels and thereby allow vehicle speed to be approximated. Where an air suspension is used, height of the vehicle may be held constant by varying air pressure to each of the air springs 444 under the control of stability and height controller 46. Pressure sensor 422 readings may then be equated to vehicle weight as is known in the art.

Figure 6:
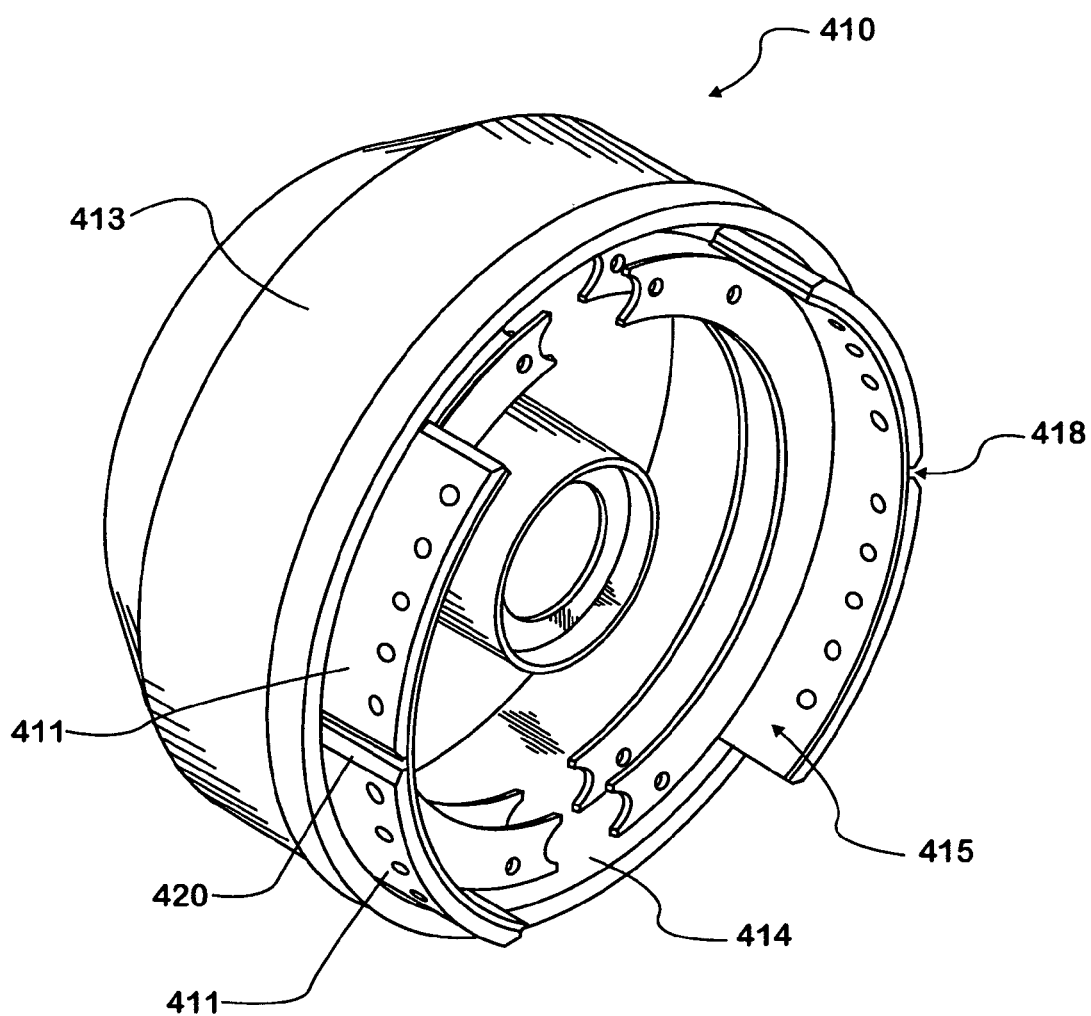

Referring now to FIG. 6, a brake drum 413 has an inner brake surface 414 for frictionally engaging the brake lining 411. An actuator such as an S-cam arrangement displaces the brake shoes 415 outwardly towards the inner brake surface 414 bringing brake lining 411 into contact with the inner brake surface. Brake linings 411 are mounted to the brake shoe 415 to frictionally engage the brake drum 13 and thus provide braking force. The generic brake drum arrangement 410 and actuation mechanism is completely conventional and is well known in the art.

Brake lining wear is a function of contact area between the lining/pad and a brake rotor or drum, applied pressure, the coefficient of dynamic friction and the distance the rotor or drum travels over the lining while pressure is applied. This can be represented as:

$$W = K \times C_f \times D \times P$$

In the above relationship K is a constant, $C_f$ is the dynamic coefficient of friction, D is the distance the rotor or drum travels over the lining/pad and P is the pressure applied to the lining. Pressure applied to the lining is directly proportional to the brake application air pressure measured by the ABS system and reported to the body computer 44. Any required conversion factor may be folded into K.

Brake drum or rotor travel distance is proportional to the integral of vehicle speed over the time period that braking is applied. For a brake rotor the travel distance is further proportional to the mean radius of the pad location as related to the center of the wheel axle. For a brake drum the travel distance can be directly related to lining area. Where V is vehicle speed and T is the time that pressure is applied then:

$$W = K \times C_f \times P \times V \times T$$

In practical application it is useful to consider the algorithm as an estimator valid over the life of a brake pad. Brake application pressure is preferably directly measured by means of the pressure sensors shown. However, pressure may be derived by measurement of brake pedal movement, or estimated by use of the output of a brake application pressure switch which is used to operate a brake lamp circuit (not shown). This is an estimate based upon application knowledge of applied pressure. Sensed pressure provides optimum information.

Where vehicle weight is known, preferably from an on board determination of axle load, brake wear and temperature may be estimated by computation of energy dissipated by braking action, that is by the change in velocity ($\Delta V$) of the vehicle. The total kinetic energy dissipated where M is equal to mass of the vehicle then is:

$$\Delta E_K = \frac{1}{2} M \times \Delta V^2$$

The energy lost during braking is dissipated through the braking system, which occurs through the generation of heat. Both brake lining wear and temperature rise are proportional to the energy dissipated. Brake application pressure is no longer a required value. However, wear and temperature estimation both must take into the account the possibility of engine braking and downshifting. Usually, during engine braking, conventional braking is not used, there the algorithms reflect cooling since the brakes are not in use. If engine braking is employed, the energy absorbed by the engine would be calculated as a function of engine speed and the result subtracted from the total energy dissipated as indicated by the changes in velocity occurring while the brakes are in use.

Brake lining temperature rise is proportional to the integral of the wear estimator as a function of time. In particular, since convective air cooling is almost always present, a time constant is involved both for heating, when the brake is applied, and for cooling when the brake is released. Specifically for heating and cooling of the brakes, respectively, $$T = k p_a \omega (1 \times e^{-v/T}) \text{ and}$$

$$T = k p_a \omega e^{-v/T}.$$

In the above relationships k is a constant, $p_a$ is pressure applied, T is wheel angular velocity, t is the time duration of application of the brakes and T is the time system constant. Ambient temperature is typically taken to be the same as air temperature taken from the engine air intake temperature sensor 58B. It is the starting point for the algorithms for comparison to a maximum allowed brake lining temperature which is in turn taken from the manufacturer's rating for the brake. Brake lining temperature is determined by running a summation of the cooling and heating temperature rise for the lining.

Figure 7:
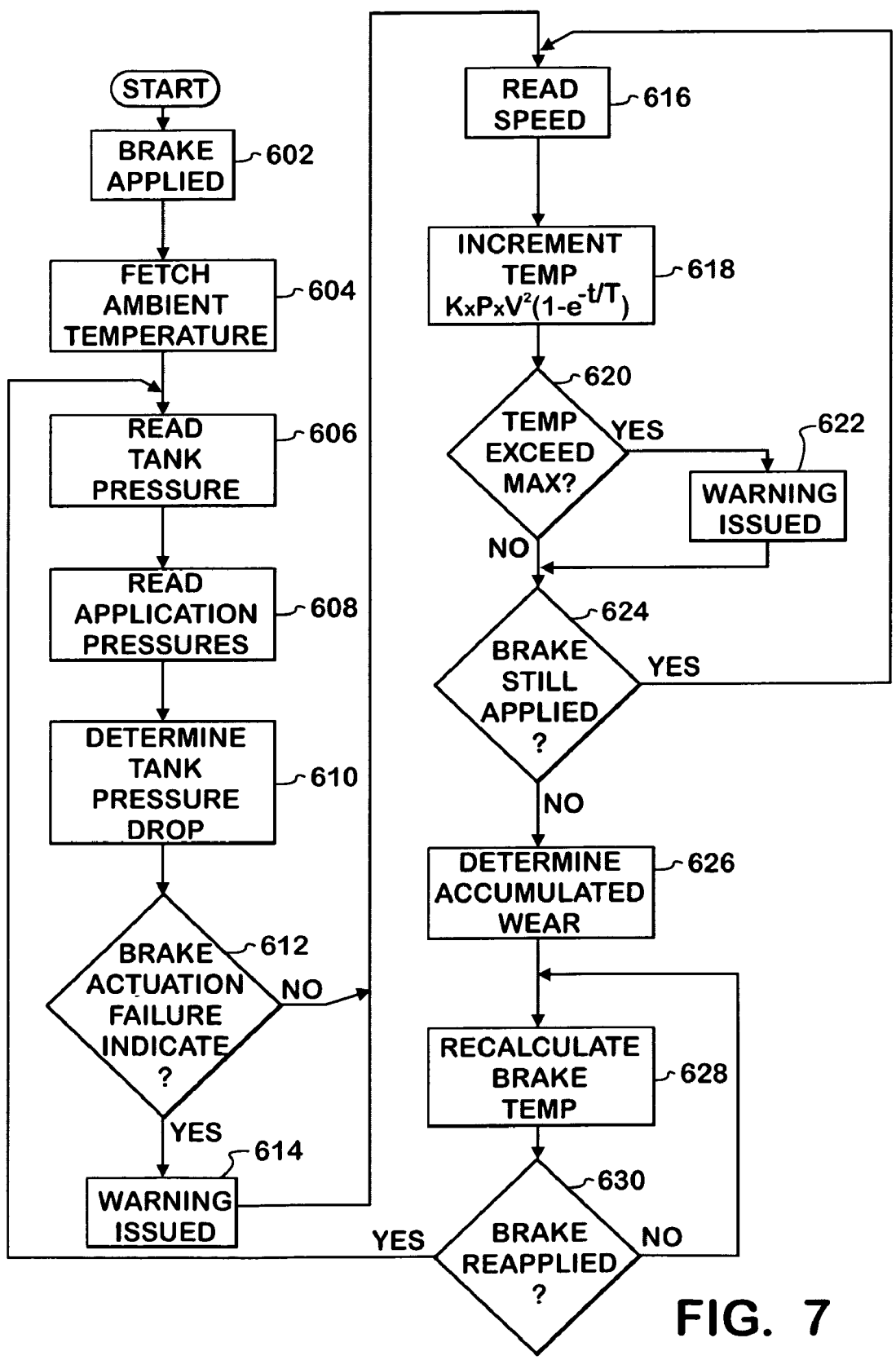
FIG. 7 is a high level flow chart illustrating a temperature and wear estimation algorithm.

Referring to FIG. 7 a flow chart illustrating implementation of an algorithm for brake application pressure sensing is described. An algorithm for weight based system would modify only the heat increment and decrement steps, and substitute Kinetic energy calculations for pressure readings. On an initial start of the vehicle, or after a sufficiently long period of rest of the vehicle during which the brakes are likely to a reached ambient temperature, the process begins. With the initial application of the brakes (step 602) the process reads the ambient temperature (engine air intake temperature) (step 604) supplied by the engine controller 45. The air brake compressed air tank pressure is read at step 606. At step 608 the individual brake application pressures are read. Then, at step 610 the tank pressure drop is determined. A tank pressure drop that is less than expected may be taken as indication of a possible brake actuation valve failure (step 612), occurrence of (the YES branch from step 612) which results in the appropriate warning being issued (step 614). Following the NO branch from step 612 or following execution of step 614 processing advances to step 616 where vehicle speed is read. Next, the first recalculation of temperature is executed. (step 618). The result of this evaluation is compared to a do not exceed temperature (step 620). If the temperature is excessive, a warning is provided to the driver. (step 622 following the YES branch from step 620). Next, a test to see if the brakes are still applied is executed. (step 624). If the brakes remain actuated program execution returns to step 616 to update speed and to recalculate the incremental increase in temperature.

Release of the brakes requires determining the extent of cooling. Following the NO branch from step 624, accumulated wear of the brake pads or lining is calculated (step 626). Next, at step 628 brake temperature is recalculated for cooling. Next, at step 630 it is determined if the brakes have been reapplied. If not, program execution returns to step 628 to again redetermine the downward change in temperature. If the brakes have been reapplied the program returns to step 606 to read compressed air tank air pressure and execution of the steps following.

While the invention is shown in only one of its forms, it is not thus limited but is susceptible to various changes and modifications without departing from the spirit and scope of the invention.

What is claimed is:

1. Apparatus for estimating brake lining wear and lining temperature for a plurality of brake units installed on a vehicle, the apparatus comprising:
   a source of temperature readings exogenetic to the plurality of brake units;
   a source of vehicle weight measurements;
   a plurality of independent brake actuators;
   a central source of pressurized actuation fluid connected to each of the plurality of brake actuators;
   vehicle
   an engine brake;
   an engine controller providing indication of operation of the engine brake;
   a brake controller for generating brake actuation signals for application to the independent brake actuators;
   a transmission controller providing indication of which transmission gear selection for a vehicle transmission;
   a vehicle body computer;
   a vehicle data bus connected between the brake controller, the engine controller, the transmission controller, the source of vehicle weight measurements and the vehicle body computer for two way data communication between the brake, engine and transmission controllers, the source of vehicle weight measurements and the vehicle body computer including communication of signals indicative of activation of the brake units, engine brake operation and transmission gear selection to the vehicle body computer;
   a source of indication of vehicle wheel speed coupled to the vehicle body computer over the vehicle data bus; and
   the vehicle body computer being programmed to collect the exogenetic temperature readings, vehicle speed data and indications of braking for calculating estimates for wear of the linings and increasing increments in temperature estimations of the linings of the brake units, the processes of calculation including determining vehicle kinetic energy responsive to indication of beginning and ending braking to determine a change in kinetic energy, adjusting the determination of change in kinetic energy in proportion of the change due to operation of the engine brake, and developing an estimate in lining temperature from the change in kinetic energy attributed to operation of the brake units and the exogenetic temperature readings and to developing an estimate of lining wear from the change in kinetic energy attributed to operation of the brake units.

2. Apparatus as described in claim 1, wherein the source of the signal indicative of the activation of the brake units comprises a pressure sensor in communication with a fluidic actuation line connected to each brake unit and means for communicating pressure signals from each pressure sensor to the vehicle body computer.

3. Apparatus as described in claim 2, further comprising:
   the vehicle body computer being further programmed to determine from the pressure signals a duration of brake actuation for each brake unit and to use the pressure signal in combination with wheel speed to determine wear and temperature of the lining for each brake unit and providing for comparing the results with the temperature and lining wear estimates from the changes in kinetic energy to determine error for each brake unit.

4. Apparatus as described in claim 3, the source of vehicle weight measurements further comprising:
   a vehicle height controller providing pressure signals related to loading of axles of the vehicle; and
   the vehicle body computer being further programmed to determine axle loading from the pressure signals and to determine changes in vehicle kinetic energy from computational combination of vehicle loading and changes in the wheel velocity signals.

* * * * *